M. V. B. Williamson.
Draught-Equalizer for Double-Trees.
No. 74470      Patented Feb. 11, 1868.

Witnesses
A. Wickham Hone
R. H. Seaton

M. V. B. Williamson
By How & Weston
Attys.

United States Patent Office.

M. V. B. WILLIAMSON, OF JAMESPORT, NEW YORK.

Letters Patent No. 74,470, dated February 11, 1868.

IMPROVEMENT IN DRAUGHT-EQUALIZER FOR DOUBLE-TREES.

*The Schedule referred to in these Letters Patent and making part of the same.*

TO ALL WHOM IT MAY CONCERN:

Be it known that I, M. V. B. WILLIAMSON, of Jamesport, in the county of Suffolk, and State of New York, have invented certain Improvements in a Draught-Equalizer for Double-Trees; and I do hereby declare that the following is a full and exact description thereof, reference being had to the accompanying drawings, and to the letters of reference marked thereon.

The object of my invention is to dispense altogether with single-trees, and at the same time to produce a means for attaching draught-animals to the vehicle or other article to be drawn, in a superior manner, so that their labor shall be made easier for the animals, the liability of their becoming chafed, which exists in the ordinary manner of hitching them, obviated, and so that the motion of one animal shall not operate so much to the detriment of the other, as has hitherto been the case.

It is also the object of my invention to prevent the twisting strain on the double-tree and centre-bolt which exists in the apparatus patented by C. C. Bradley, December 3, 1861, and to bring the rear of the inside tugs or chains up level with the end of the outside ones, to obtain a more equal and direct application of the force of the animals to the work to be done, instead of having them more than the thickness of the double-tree below or above the rear ends of the outside ones, as in the invention above named.

It consists in connecting the inside tugs or chains together around a pulley or swivel at a point forward of the double-tree; also in hanging or securing the said pulley in a swinging clevis or loop, which swings laterally on a centre coincident, or nearly so, with the centre of the double-tree. In the accompanying drawings—

Figure 1:
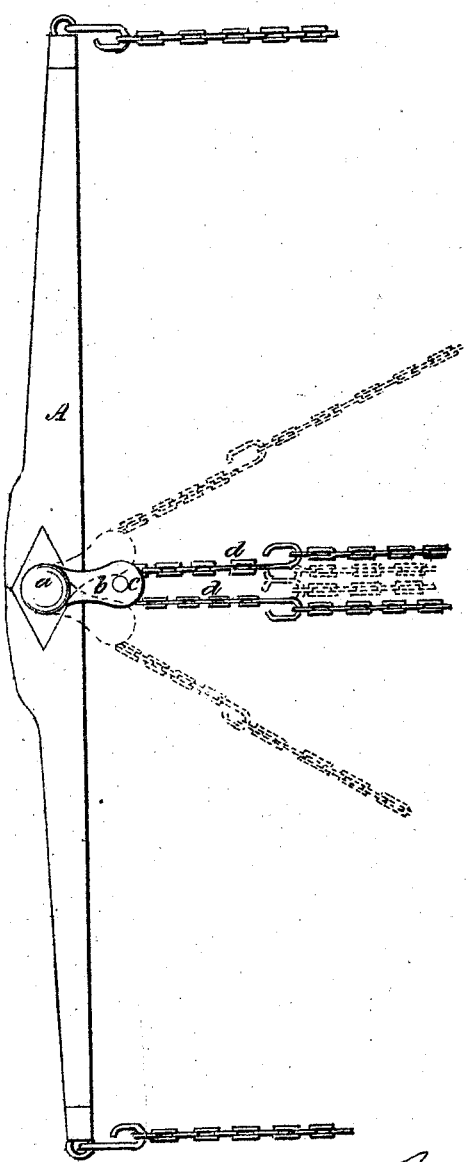
Figure 1 is a top view of a draught-equalizer and double-tree constructed according to my invention.
Figure 2:
Figure 2 is a front view of the same.

In fig. 1 the inside chains, the pulley, and the clevis are shown in black drawing to the front, and drawing to either side in colors.

A is a double-tree, which is similar to those now in use, except that it is longer, in order to receive the ends of the outside chains at its outer ends, and still have the chains far enough apart, though a variety of forms may be used, as, for example, a slightly bow-shaped double-tree would be of advantage for some purposes. $d$ are the inside tugs or chains connected together around the pulley B, which, instead of being underneath the double-tree, or above it, as described in the patent of C. C. Bradley, December 3, 1861, is directly in front of it, and level with it, which brings the inside chains $d$ up level with the outside chains, thus removing the twisting strain from the collars of the animals, from the bolt $a$, and from the double-tree, and causing the force exerted by the animals to operate squarely and evenly on the work to be done. The pulley B is hung loosely on the pin $c$ in the forward part of the clevis or arms $b$, so that the said pulley will turn freely on the pin $c$, and thus reduce the friction of the chains $d$ as they pass through the said clevis. The arms $b$ and pin $c$, making a loop or clevis for the chains $d$ to be connected through, are hung loosely on the bolt $a$, so that it will swing laterally to accommodate the motion of the horses, and always keep the line of draught of the inside chains from the bolt $a$ directly to the front. It also divides the shock of any sudden lateral motion of either horse, so that the strain on the shoulders of each will be less. To use this double-tree and draught-equalizer without a tongue or pole, as for street-cars, for which purpose it is peculiarly adapted, a loop or clevis should be hung on the bolt $a$, projecting to the rear, and, if deemed best, a link or ring can be attached to said clevis to hook on with.

The advantages which my draught-equalizer possesses over others now in use are, first, it dispenses entirely with single-trees, which reduces the numbers of parts nearly, or quite, one half, and thus renders the apparatus simpler and cheaper; second, by doing away with single-trees the rear part of the horses' legs are saved from much chafing and bruising, which the said single-trees have hitherto occasioned by striking and rubbing against them; third, the pulley, around which the tugs are connected, being hung as set forth, the said inside tugs or chains are steadier, being shorter, and consequently they are less likely to strike against the sides of the horses' legs and chafe them; fourth, the clevis or arms $b$ being pivoted, so as to have a lateral motion, the apparatus is easier for the horses, as the motion of one horse to the front or laterally compensates for that of the other, and the line of draught from the bolt $a$ is always directly forward; fifth, there is no twisting strain on the bolt $a$, the double-tree, or the collar, occasioned by the pulley B being above or below the line of draught, as in the invention of Bradley above mentioned. This and other objections to the apparatus of Bradley have prevented its coming into use.

Having thus fully described my invention, I claim—

1. Hanging the pulley B forward of the double-tree, substantially as and for the purpose set forth.
2. So constructing and attaching the arms or clevis $b$ as to allow them and the pulley B to have free lateral vibratory motion from the bolt $a$ as a centre, substantially as hereinabove specified.

M. V. B. WILLIAMSON.

Witnesses:
H. JAMES WESTON,
R. H. SEATON.